UNITED STATES PATENT OFFICE.

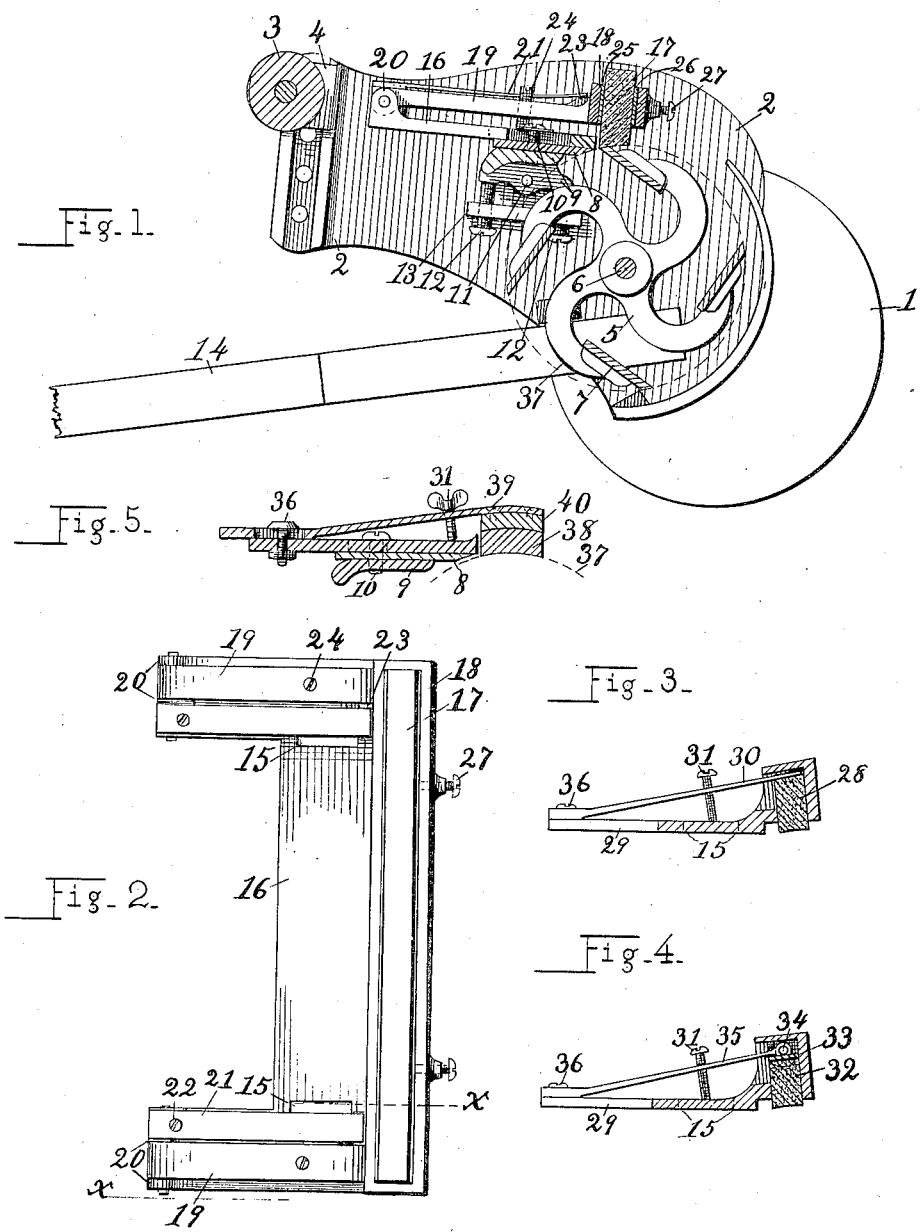

GEORGE W. MILLER, OF SANTA MONICA, CALIFORNIA.

SHARPENER FOR LAWN-MOWERS.

1,091,750.  Specification of Letters Patent.  Patented Mar. 31, 1914.

Application filed April 11, 1913. Serial No. 760,520.

*To all whom it may concern:*

Be it known that I, GEORGE W. MILLER, a citizen of the United States, residing at Santa Monica, in the county of Los Angeles and State of California, have invented certain new and useful Improvements in Sharpeners for Lawn-Mowers, of which the following is a specification.

This invention relates to sharpeners for lawn mowing machines, and its object is to provide an attachment for that class of machines which employ a series of knives attached to a revolving wheel to coact in shearing contact with a stationary blade, whereby the revolving knives may be sharpened, or the revolving knives and the stationary blade may be sharpened at the same time by merely running the machine.

To this end, my invention consists in the construction and combination of parts forming a sharpener for lawn mowers hereinafter more fully described and particularly stated in the claims, reference being had to the accompanying drawings, in which:

Figure 1, represents my lawn mower sharpener attached to an inverted lawn mower as seen in longitudinal, vertical section partly in side elevation at line $x$—$x$, Fig. 2. Fig. 2 is a plan view of the sharpener removed from the mower. Figs. 3 and 4 represent modifications of the sharpener in vertical section. Fig. 5 represents in longitudinal vertical section a modification of the sharpener in position to sharpen the revolving knives only.

Numeral 1 represents one of the drive wheels of a lawn mower, 2 a side portion of the frame, 3 the rear roller mounted in a bearing 4. Wheel arms 5 mounted on a shaft 6 to be revolved in any usual manner by the action of the drive wheel 1 carry knives 7 with their edges in the dotted circle 37 to coact in shearing contact with a stationary blade 8. The blade 8 is fixed to the rock-bar 9 in any usual manner, as by screws 10. The rock-bar is pivoted at 11 to the frame 2 and is adapted to be rocked by means of adjusting screws 12 passing through a ledge 13 of the frame, in order to tip the edge of the blade 8 to or from the path 37 of the knives 7, as may be required. The handle 14 may be considered as turned over backward and resting on the ground.

So far this description represents what is common in lawn mowers. My sharpening device shown in Fig. 2 has a base plate 16 adapted to be placed directly upon the face of the blade 8 and to be there secured by means of the blade screws 10 passing through slots 15 in the said plate. A grinder 17 of some kind of grit, such as corundum, emery or stone, is supported in a carrier 18, which is provided with rearward extending arms 19 that are pivotally hung in pairs of ears 20 of the plate 16. Springs 21 are secured by means of screws 22 to one of each pair of ears 20 to bear their free ends upon ledges 23 of the carrier 18, whereby the grinder 17 is forced, with yielding pressure, down toward the path of the revolving knives 7, but the downward movement is limited by adjusting screws 24, which are threaded through the arms 19 and bear their points upon the plate 16. By this means the grinder may be located adjacent to, that is, just touching, the circular path 37 of the knives. To prevent the grinder from chattering in its carrier and thus gradually working itself loose, I interpose a packing 25 of soft, cushion-like material, such as felt, on one side, and on the other side I interpose packing 26 of lead, soft iron or other material that the screws will indent, between the grinder 17 and its binding screws 27. This packing prevents the screws from digging holes in the grinder and permits the grinder to be accurately set in the first instance to just touch the knife edges throughout their length, and then to very firmly bind it against the cushion 25.

In the modification shown in Fig. 3 the grinder 28 is held directly in the body 29 and is impelled downward by springs 30, whose downward movement is limited by screws 31, which are threaded through them and bear upon the body 29. This modification and the one shown in Fig. 4 are provided with slots, as shown at 15, Fig. 2, for attachment to the machine directly upon the blade, as described relatively to base plate 16.

In the modification shown in Fig. 4 the grinder 32 is fitted to slide in the body 29, but it is fastened to a carrier 33 which is pivoted at 34 to a spring 35, through which an adjusting screw 31 is threaded and bears on the body 29, as in Fig. 3; and both of these springs 30 and 35 are secured to the body in like manner by screws 36.

The modification shown in Fig. 5 represents its grinder 38 secured to a spring 39 by means of an intermediate block of wood 40, which may be secured to the grinder in any suitable manner, as by cement. This spring is slotted to receive the securing screw 36, so that it may be set forward or rearward to locate the grinder, as desired.

The features in common in the four forms shown are securing the body of the device directly upon the face of the lawn mower blade, and bringing the grinder in contact with the revolving knives at a point directly in front of the fixed blade and adapting the grinder to grind both the rotary knives and stationary blade at the same time, as shown in Fig. 1, or to grind only the rotary knives, as shown in Fig. 5.

In operation the grinder should be adjusted to barely touch the whole length of the revolving blades, then the machine should be drawn over the ground in the direction to revolve the knives forward as in mowing. As the grinding of the knives progresses it may be seen in Fig. 1 that the stationary blade is also being ground. This is due to particles of grit being carried from the grinder to the blade by the knives and wearing on the blade; the grinder being located so near the blade that its grit is not lost while the knives pass from grinder to blade. By adjusting the screws 24 the grinder may be set more and more down until the knives are given perfect edges, and by means of the rocking screws 12 the blade may also be brought more and more toward the path 37 of the knives to maintain perfect shearing contact with them until it will also be given a perfect edge. It will be understood that when the grinder becomes worn away until the carrier 18 hits down on the plate 16 the carrier may be again raised by the screws 24, and by loosening the screws 27 the grinder may be let down for a new lease of service.

In Fig. 5 the blade 8 is tipped up away from the path 37 of the knives, while the grinder 38 is set to act on the knives only. In this position the particles of grit are carried past the blade 8 without touching it.

I claim:

1. In a sharpener for lawn mowers of the class described, a grinder as long as the rotary knives; a base plate and means for securing it directly upon the face of the stationary blade, and means adjustably connecting the grinder and the base plate whereby the grinder may be held near to the edge of the blade while both the blade and grinder are tangent to the circle of the rotary knives.

2. In a sharpener for lawn mowers of the class described, a base plate and means for securing it directly upon the face of the stationary blade; a grinder as long as the rotary knives; means connected with the plate for holding the grinder in front of the said blade; springs connected with the plate and acting to press the grinder down in front of the blade, and adjusting screws for limiting the action of the springs.

In testimony whereof I affix my signature in presence of two witnesses.

GEORGE W. MILLER.

Witnesses:
H. E. HUDSON,
F. J. TOWNSEND.

---

Copies of this patent may be obtained for five cents each, by addressing the "Commissioner of Patents, Washington, D. C."